3,408,408
PROCESS FOR PREPARING BIS-(3,5,6-TRICHLORO-2-HYDROXYPHENYL) METHANE
John W. Drew, Basking Ridge, and William E. Rosen, Summit, N.J., assignors to Hoffman Laboratories, Inc., Springfield, Mo., a corporation of Missouri, and Cambridge Research Inc., Roselle, N.J., a corporation of New Jersey
No Drawing. Filed June 3, 1965, Ser. No. 461,196
8 Claims. (Cl. 260—619)

ABSTRACT OF THE DISCLOSURE

This invention relates to a process for the production of bis-(3,5,6-trichloro-2-hydroxyphenyl) methane, which is commonly known in the trade as hexachlorophene, by reacting 2,4,5-trichlorophenol, a formaldehyde-yielding substance and chlorosulfonic acid, either in the presence or absence of organic solvents, to condense 2,4,5-trichlorophenol with formaldehyde and form concentrated sulfuric acid and hydrogen chloride gas.

---

Earlier processes for preparing bis-(3,5,6-trichloro-2-hydroxyphenyl) methane have involved the condensation of approximately two moles of 2,4,5-trichlorophenol with one mole of formaldehyde or of a formaldehyde yielding substance in the presence of sulfuric acid or oleum as a condensation agent. An early process, as reported in U.S. Patent 2,250,480, carried out this condensation in methanol. Large amounts of $H_2SO_4$, low reaction temperatures and long reaction times were necessary and considerable waste acid was produced. The process was improved by using very concentrated $H_2SO_4$ or oleum, U.S. Patent 2,435,593, but lengthy purification procedures were necessary to obtain a product of desired purity. The process was further improved, in accordance with U.S. Patent 2,812,365, by conducting the reaction at elevated temperature in a heavy chlorinated solvent such as ethylene dichloride, with which sulfuric acid is insoluble, separating the sulfuric acid layer after the reaction and recovering the condensation product from the ethylene dichloride layer by adding water, steam distilling off the organic solvent and filtering the suspended product from the residual water. The sulfuric acid from such process is said to be recoverable but contamination with organic residues makes its use for most purposes impractical. Therefore, it is usually discarded.

An object of the present invention is to provide an improved process for the preparation of bis-(3,5,6-trichloro-2-hydroxyphenyl) methane.

Another object of the invention is to provide a process for the preparation of bis-(3,5,6-trichloro-2-hydroxyphenyl) methane, which can be completed in a short time, is adaptable to either batch or continuous operation and which provides a product of suitable purity in good yield.

Another object of the invention is to provide a process for the preparation of bis-(3,5,6-trichloro-2-hydroxyphenyl) methane which can be conducted either in the presence or absence of organic solvents.

These and other objects and advantages of the invention, which will become apparent as the description proceeds, are accomplished by the use of chlorosulfonic acid ($HSO_3Cl$) as the condensing agent in lieu of $H_2SO_4$ or oleum. The reaction proceeds smoothly and rapidly and can be controlled by the rate of addition of the reactants to each other. The reaction produces HCl as a gas and when stoichiometric proportions of reactants are employed produces $H_2SO_4$ in substantially 100% concentration.

The reaction is illustrated by the following equation:

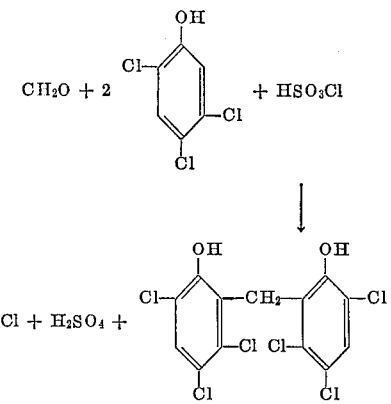

The addition of the chlorosulfonic acid to a mixture of the other reactants is more convenient but the order of addition of the materials to each other is not a critical factor. The addition time is limited only by the vigor of gas evolution (HCl) and in small batches can be employed within several minutes. No problem is involved when the reactants are mixed on a continuous basis. At elevated temperatures, e.g. above and about 70° C., the condensation reaction is substantially complete within several minutes after the reactants have been combined but the reactants may be held at reaction temperature for longer times, if desired. The HCl evolved from the reactor may be scrubbed and is of a suitable quality for commercial use. The product may be worked up in any desired fashion, such as by crystallization from organic solvents, to provide high quality bis-(3,5,6-trichloro-2-hydroxyphenyl) methane in good yield.

Formaldehyde or formaldehyde yielding materials, as known in the art, may be employed in the condensation reaction. Paraformaldehyde is the preferred reactant. The 2,4,5-trichlorophenol should be as pure as possible. 2,4,5-trichlorophenol having a melting point of 66° C. was used in the examples reported herein.

In general, the paraformaldehyde and 2,4,5-trichlorophenol are fed to the reaction vessel in the molar ratio of one to two, but if desired, an excess of paraformaldehyde may be present. Up to 50% excess paraformaldehyde has been used successfully, e.g. from about 1 to 1.5 moles of paraformaldehyde may be used for each 2 moles 2,4,5-trichlorophenol.

Substantially equimolar amounts of chlorosulfonic acid with respect to paraformaldehyde are preferred but lesser amounts as well as an excess, within limits, provide satisfactory results. Less than one mole of $HSO_3Cl$ per mole of paraformaldehyde requires longer reaction times to give equivalent yields and the $H_2SO_4$ produced is less concentrated. Greater amounts, e.g., 50% molar excess may cause some product destruction with reduced yields. The preferred range is therefore, approximately ¾ to 1½ moles of $HSO_3Cl$ per mole of $CH_2O$.

As aforementioned, the reaction can be conducted either in the presence or absence of an organic solvent. The chlorinated organic solvents in which chlorosulfonic acid is soluble e.g., ethylene dichloride and chloroform, are quite satisfactory. Any amount of the solvent can be used. It is convenient to use an amount of solvent which will facilitate recovery of the reaction mixture from decolorizing adsorbents which are used during the purification steps. However, the solvent for this purpose can be added after reaction is complete and such solvent need not be one of the chlorinated solvents. Toluene, benzene and other relatively inexpensive organic solvents may be used at this stage. Where a solvent is employed during the reaction, the reaction mass may be refluxed from several minutes to several hours at the reflux temperature of the solvent, e.g. 70–90° C., but with the preferred proportions of reactants, a few minutes at this temperature is usually all that is necessary to substantially complete the reaction. Longer reaction times at lower temperatures may of course, be employed. Where no solvent is used, the reaction proceeds substantially to completion in several minutes at 100° C., but lower or higher temperatures may be employed. In general, the reaction temperature with or without solvents may be varied from about room temperature up to about 150° C., depending on how rapidly it is desired to complete the reaction.

The use of chlorosulfonic acid in lieu of sulfuric acid or oleum for th econdensation reaction carried out in a chlorinated solvent medium such as ethylene dichloride, has a distinct advantage in that chlorosulfonic acid is soluble in these solvents, whereas sulfuric acid and oleum are insoluble or immiscible. Therefore, uniform reaction conditions are more readily obtained with chlorosulfonic acid, minimizing the importance of stirring or agitation, both during continuous and batch operations. The invention is illustrated by the following examples of practice.

Example I

A mixture of 19.75 g. of 2,4,5-trichlorophenol (0.100 mole), 1.63 g. of paraformaldehyde (0.0515 mole) and 70 ml. of ethylene dichloride was stirred and brought to atmospheric reflux, providing a 2,4,5-trichlorophenol solution containing suspended paraformaldehyde. To this suspension, 3.30 ml. of chlorosulfonic acid (0.0504 mole) were added over a period of 35 seconds. The addition of the chlorosulfonic acid was accompanied by vigorous gas evolution and formation of a distinct acid layer. The mixture was stirred and refluxed for 5 minutes, allowed to settle and the upper ethylene dichloride layer was then decanted. The remaining acid layer containing $H_2SO_4$ of substantially 100% concentration, was extracted with two 17.5 ml. portions of hot ethylene dichloride, and the combined ethylene dichloride solutions were stirred with 2.0 g. of adsorbent earth (Hyflo Super Cel) and 2.0 of decolorizing charcoal (Norite A) for 15 minutes at 75° C. After filtration, the solution was concentrated at reduced pressure to a volume of about 80 ml. and the resulting sparkling clear, light yellow solution was chilled overnight in the refrigerator (ca. 5° C.) The product crystallized as pure white crystals. These were collected, washed with 10 ml. of cold ethylene dichloride, and dried under vacuum, to provide 15.93 g. (78.5%) of white hexachlorophene, melting point 163–165° C.

A second crystal crop from the mother liquor provided 1.30 g. (6.4%) of white crystalline hexachlorophene, melting point 159–161.5° C. The total yield of hexachlorophene melting over 160° C. was 84.9%. Evaporation of the ethylene dichloride mother liquor provided a light gray residue containing additional hexachlorophene.

Example II

The procedure of Example I was repeated with reflux times of 2 hours and 4 hours, respectively, with yields of hexachlorophene melting over 160° C. of 84.7% and 89.2%, respectively.

Example III

The procedure of Example I was repeated with 0.88 moles of chlorosulfonic acid per mole of $CH_2O$. With 5 minutes reflux time, the yield of hexachlorophene melting over 160° C. was 72.6%. With 2 hours reflux time, the yield increased to 84.3%. The concentration of the separated $H_2SO_4$ was 97.8%.

Example IV

The procedure of Example I was repeated using 0.76 moles of $CH_2O$. With the reflux time of 2 hours, the yield of hexachlorophene melting over 160° C. was 81.8%. The concentration of the separated $H_2SO_4$ was 95.0%.

Example V 25 ml. of chlorosulfonic acid per mole of 2,4,5-trichlorophenol were added to a mixture of 1 mole of paraformaldehyde and 2 moles of 2,4,5-trichlorophenol in the absence of a solvent. After a 5 minute reaction time at 100° C., the reaction mass was dissolved in hot ethylene dichloride, the acid layer separated, and the hexachlorophene product worked up as in Example I. On crystallization from the solvent, a first crop of crystals in 78% overall yield from the 2,4,5-trichlorophenol with a melting point of 162–164° C., clear and colorless, were obtained. The results were fully comparable with those obtained with solvent present during the reaction.

With chlorosulfonic acid, the reaction times with and without solvents are substantially the same, so that continuous operations can be conducted either with or without solvent being present in the reactor. Where no solvent is employed, the mixing of heavy solids is required in the reactor. However, with the absence of solvent at this point, a cheaper solvent than ethylene dichloride, e.g. toluene, benzene or the like may be employed for crystallization of the product.

It will be understood that other methods of working up the product after the reaction has been completed may be used. For example, the organic solvents may be removed by steam distillation and the hexachlorophene recovered by precipitation from water. Regardless of the work-up of the product, the novel process is characterized by rapid but controllable reaction conditions, production of a minimum quantity of by-product sulfuric acid and by good yields of hexachlorophene of high quality.

We claim:
1. A process for the production of bis-(3,5,6-trichloro-2-hydroxyphenyl) methane comprising mixing 2,4,5-trichlorophenol, paraformaldehyde and chlorosulfonic acid in the proportions of about 1 to 1.5 moles of paraformaldehyde for each two moles of 2,4,5-trichlorophenol and from about 0.75 to 1.5 moles of chlorosulfonic acid for each mole of paraformaldehyde, maintaining the reactants at a temperature in the range of about 25° C. to 150° C. until the reaction is substantially complete, removing gaseous HCl during the course of the reaction, and separating the product from the $H_2SO_4$ formed during the reaction.

2. The process of claim 1 wherin the reactants are employed in approximately stoichiometric proportions for formation of bis-(3,5,6-trichloro-2-hydroxyphenyl) methane, $H_2SO_4$ and HCl.

3. The process of claim 1 wherein the reactants are fed continuously to a reactor and the reaction products are continuously withdrawn.

4. A process for the production of bis-(3,5,6-trichloro-2-hydroxyphenyl) methane comprising mixing 2,4,5-trichlorophenol, paraformaldehyde and chlorosulfonic acid in ethylene dichloride, the reactants being in the proportions of about 1 to 1.5 moles of paraformaldehyde for each two moles of 2,4,5-trichlorophenol and from about 0.75 to 1.5 moles of chlorosulfonic acid for each mole of paraformaldehyde, refluxing the mixture, driving off HCl gas, separating $H_2SO_4$ formed during the reaction from ethylene dichloride containing the condensation product, and recovering the condensation product from the ethylene dichloride.

5. The process of claim 4 wherein one of the reactants is added to the other reactants in the solvent at a rate which controls the vigor of gas evolution.

6. The process of claim 4 wherein the solution of condensation product is ethylene dichloride, after separation of the sulfuric acid, is purified by treatment with decolorizing adsorbents, and the condensation product is crystallized from the purified solution.

7. The process of claim 4 wherein the reactants are employed in substantially stoichiometric proportions and wherein $H_2SO_4$ of approximately 100% concentration is formed.

8. The process of claim 4 wherein the reaction mass is maintained at reflux temperature for no longer than about 5 minutes after the addition of the last reactant.

References Cited

UNITED STATES PATENTS

| | | | |
|---|---|---|---|
| 3,196,185 | 7/1965 | Ranson. | |
| 2,500,961 | 3/1960 | Rueggeberg et al. | 260—649 |
| 2,435,593 | 2/1948 | Luthy et al. | 260—619 |
| 2,812,365 | 11/1957 | Gump et al. | 260—619 |

OTHER REFERENCES

Encyclopedia of Chemical Technology, ed. by Kirk et al., New York, Interscience, vol. 3, 1949, pp. 885–7.

Groggins, P.H. Unit Processes, in Organic Synthesis, New York, McGraw-H 11, 1958, pp. 323–4.

LEON ZITVER, *Primary Examiner.*

H. ROBERTS, *Assistant Examiner.*